US012737115B2

(12) United States Patent
Chen et al.

(10) Patent No.: US 12,737,115 B2
(45) Date of Patent: Sep. 15, 2026

(54) WORKLOAD-AWARE MEMORY RECLAMATION ON GRAPH DATABASES

(71) Applicants: Lemon Inc., Grand Cayman (KY); Beijing Volcano Engine Technology Co., Ltd., Beijing (CN)

(72) Inventors: Cheng Chen, Singapore (SG); Wei Zhang, Beijing (CN); Zhigang Zeng, Beijing (CN); Shijiao Yang, Beijing (CN); Bingyu Zhou, Beijing (CN); Huiming Zhu, Beijing (CN); Chao Chen, Beijing (CN); Yongjun Zhao, Beijing (CN); Yingqian Hu, Beijing (CN); Miaomiao Cheng, Beijing (CN); Meng Li, Beijing (CN); Hongfei Tan, Beijing (CN); Mengjin Liu, Beijing (CN); Hexiang Lin, Beijing (CN); Shuai Zhang, Beijing (CN); Lei Zhang, Beijing (CN)

(73) Assignees: Lemon Inc., Grand Cayman (KY); Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/977,223

(22) Filed: Dec. 11, 2024

(65) Prior Publication Data

US 2025/0103204 A1 Mar. 27, 2025

(51) Int. Cl.
*G06F 3/06* (2006.01)

(52) U.S. Cl.
CPC .......... *G06F 3/0608* (2013.01); *G06F 3/0653* (2013.01); *G06F 3/0673* (2013.01)

(58) Field of Classification Search
CPC .... G06F 3/0608; G06F 3/0653; G06F 3/0673; G06F 12/023; G06F 16/2246; G06F 16/9024
See application file for complete search history.

(56) References Cited

U.S. PATENT DOCUMENTS 8,775,751 B1 * 7/2014 Pendharkar ........... G06F 3/0689 707/657
11,842,051 B2 12/2023 Yarimi et al.
(Continued)

OTHER PUBLICATIONS

Levandoski, J. et al. “The Bw-Tree: A B-tree for New Hardware Platforms,” Proceedings of the 2013 IEEE 29th International Conference on Data Engineering (ICDE), Apr. 8, 2013, Brisbane, QLD, Australia, 12 pages.
(Continued)

*Primary Examiner* — Zhuo H Li
(74) *Attorney, Agent, or Firm* — Alleman Hall LLP

(57) ABSTRACT

Implementations for performing workload-aware space reclamation are provided. One example includes a computing system comprising: processing circuitry and memory storing instructions that, during execution, causes the processing circuitry to: track extent usage characteristics for each of a plurality of extents storing data for a graph database; and perform memory reclamation to reclaim storage areas corresponding to invalid data, wherein performing the memory reclamation comprises: generating a list of extents to be reclaimed based on the tracked extent usage characteristics; and reclaiming memory space on the plurality of extents in order based on the list of extents.

14 Claims, 6 Drawing Sheets

(56) References Cited

U.S. PATENT DOCUMENTS

2018/0342007 A1* 11/2018 Brannigan ......... G06Q 30/0643
2019/0205265 A1* 7/2019 Fang ..................... G06F 9/4843
2020/0042607 A1* 2/2020 Mitsuma ............... G06F 16/119
2020/0334142 A1* 10/2020 Danilov .................. G06F 3/067

OTHER PUBLICATIONS

Li, C. et al., "ByteGraph: A High-Performance Distributed Graph Database in ByteDance," Proceedings of the VLDB Endowment, vol. 15, No. 12, Aug. 1, 2022, 13 pages.
European Patent Office, Extended European Search Report Issued in Application No. 25195551.4, Nov. 14, 2025, Germany, 11 pages.
Zhang, W. et al., "BG3: A Cost Effective and I/O Efficient Graph Database in ByteDance," Proceedings of SIGMOD/PODS '24: International Conference on Management of Data, Jun. 9, 2024, Santiago, Chile, 13 pages.
Zhao, P. et al., "Graph Indexing: Tree + Delta >= Graph," Proceedings of VLDB '07: 33rd International Conference on Very Large Data Bases, Sep. 23, 2007, Vienna, Austria, 12 pages.

* cited by examiner

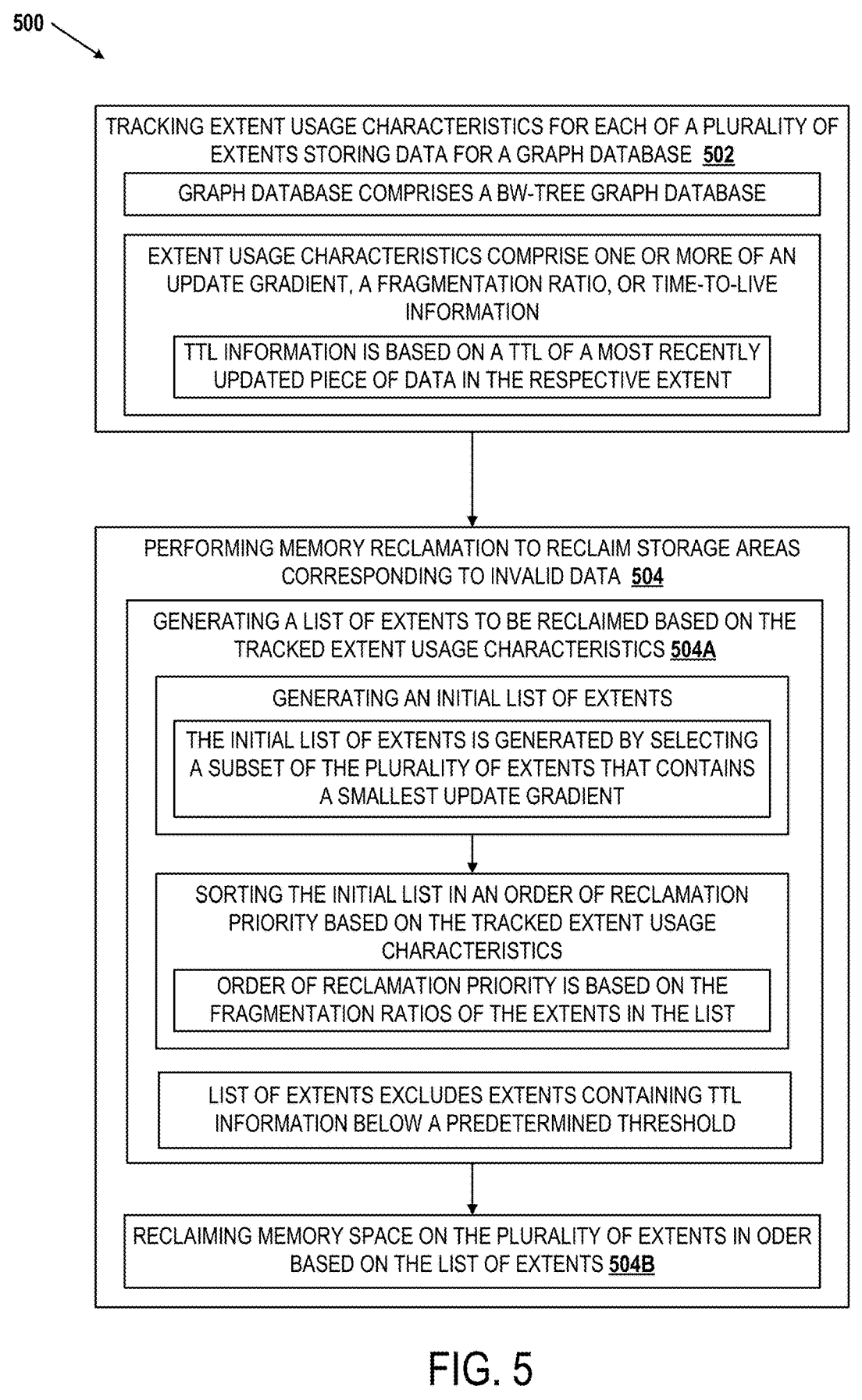

500

TRACKING EXTENT USAGE CHARACTERISTICS FOR EACH OF A PLURALITY OF EXTENTS STORING DATA FOR A GRAPH DATABASE 502

GRAPH DATABASE COMPRISES A BW-TREE GRAPH DATABASE

EXTENT USAGE CHARACTERISTICS COMPRISE ONE OR MORE OF AN UPDATE GRADIENT, A FRAGMENTATION RATIO, OR TIME-TO-LIVE INFORMATION

TTL INFORMATION IS BASED ON A TTL OF A MOST RECENTLY UPDATED PIECE OF DATA IN THE RESPECTIVE EXTENT

PERFORMING MEMORY RECLAMATION TO RECLAIM STORAGE AREAS CORRESPONDING TO INVALID DATA 504

GENERATING A LIST OF EXTENTS TO BE RECLAIMED BASED ON THE TRACKED EXTENT USAGE CHARACTERISTICS 504A

GENERATING AN INITIAL LIST OF EXTENTS

THE INITIAL LIST OF EXTENTS IS GENERATED BY SELECTING A SUBSET OF THE PLURALITY OF EXTENTS THAT CONTAINS A SMALLEST UPDATE GRADIENT

SORTING THE INITIAL LIST IN AN ORDER OF RECLAMATION PRIORITY BASED ON THE TRACKED EXTENT USAGE CHARACTERISTICS

ORDER OF RECLAMATION PRIORITY IS BASED ON THE FRAGMENTATION RATIOS OF THE EXTENTS IN THE LIST

LIST OF EXTENTS EXCLUDES EXTENTS CONTAINING TTL INFORMATION BELOW A PREDETERMINED THRESHOLD

RECLAIMING MEMORY SPACE ON THE PLURALITY OF EXTENTS IN ODER BASED ON THE LIST OF EXTENTS 504B

FIG. 5

WORKLOAD-AWARE MEMORY RECLAMATION ON GRAPH DATABASES

BACKGROUND

A graph database is a type of database that represents and stores data using graph structures. Graph components include nodes, edges, and properties, which can be used to describe and store data entries and their relationships. Such structures enable the use of graph algorithms to analyze relationships among data in ways that would be difficult to see with other methods. As the connectedness and data volume of the graph increase, graph algorithms become a more powerful tool for analyzing and utilizing data cost-effectively. For example, querying relationships in a graph database can involve graph traversal algorithms that take advantage of the connectivity within a graph to provide more efficient querying compared to relational database queries. Paths, distances between nodes, and clustering properties of nodes provide intuitive indicators of various database properties. Because the graph itself explicitly stores relationships, queries and algorithms performed on the graph components can be quickly executed. In contrast, traditional relational database calculates relationships during queries through numerous fundamental operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations for performing workload-aware space reclamation are provided. One example includes a computing system comprising: processing circuitry and memory storing instructions that, during execution, causes the processing circuitry to: track extent usage characteristics for each of a plurality of extents storing data for a graph database; and perform memory reclamation to reclaim storage areas corresponding to invalid data, wherein performing the memory reclamation comprises: generating a list of extents to be reclaimed based on the tracked extent usage characteristics; and reclaiming memory space on the plurality of extents in order based on the list of extents.

BRIEF DESCRIPTION OF THE DRAWINGS

FIG. 5 shows a process flow diagram of an example method for performing workload-aware memory reclamation, which can be implemented using the example computing system of FIG. 1.

DETAILED DESCRIPTION

Figure 1:
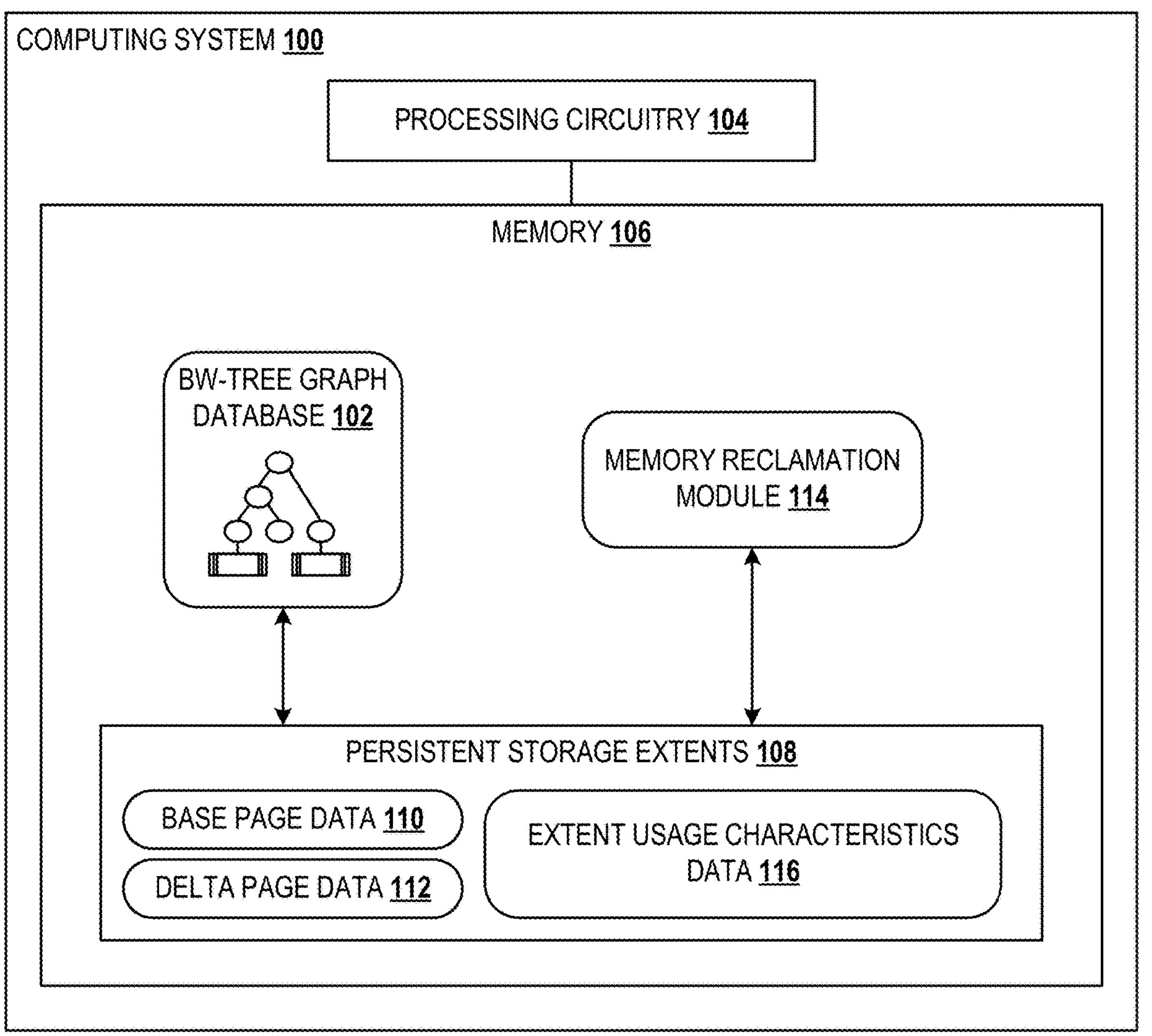
FIG. 1 shows a schematic view of an example computing system for implementing a graph database with workload-aware memory reclamation.

Graph databases can be used to store large-scale graph data for various applications. Generally, graph databases are implemented using tree structures to provide powerful algorithmic capabilities, such as fast queries, insertions, deletions, etc. Various types of tree graphs have been contemplated for use in database systems, including but not limited to binary trees, m-ary trees, B-trees, B+ trees, and Bw-trees. Different structures may have different advantages depending on the application. In one example, Bw-trees can be advantageously implemented on a social media platform for storing various types of information relating to users and their actions. In one such application, the interactions of users "liking" a piece of media content (e.g., image, video, etc.) or "following/subscribing" another user can be stored and utilized for various purposes. For example, information relating to each user's preferences for media content can provide support for various functionalities such as providing recommendations based on the user's preferences.

The interactions between users and media content/other users can be stored in various ways. One way includes having each user and media content be represented as a node on a graph. Edges between the nodes can represent a like-action or a follow-action performed by a user on a media content or another user, respectively. The edges, as well as the edge features (e.g., the time when the like-action was performed) can then be stored on the Bw-tree. For example, the source and destination nodes of the edge can be stored as a key, and the edge features can be stored as a corresponding value using a key-value storage engine scheme.

Different design implementations introduce different issues. For example, in some Bw-tree graph databases, the base pages and delta pages of a Bw-tree are typically written to a shared cloud storage to ensure data persistence. Traditionally, memory reclamation, or storage space reclamation, on such a system is managed through a first-in-first-out (FIFO) queue. When new data is added, it is added to the front of the queue. During a memory reclamation cycle, the process scans from the back of the queue and rewrites valid data to the front of the queue, reclaiming the memory space occupied by invalid data in the process. However, this Bw-tree memory reclamation strategy does not consider the memory reclamation rates of different data segments, resulting in significant write amplification due to inefficient background data movement. From a memory reclamation perspective, the writing patterns of base pages and delta pages are generally different. For example, compared to base pages, delta pages have a shorter lifespan and a higher memory reclamation rate.

To improve the efficiency of memory reclamation and to reduce write amplification, base page and delta page data can be segregated into two separate streams for individual reclamation. Additionally, the streams can be divided into uniformly-sized extents. When memory reclamation is performed, extents with a high ratio of reclaimable memory for data movement can be targeted, thereby reducing write amplification rate. However, this strategy fails to consider several aspects of practical application. Taking the above example of implementation on a social media platform, there is typically a power-law distribution in the activity level of users, resulting in a disparity in the popularity of videos (e.g., number of views, likes, favorites, etc.). This presents a clear distinction between "hot" and "cold" content that is accessed and updated at different rates. For example, the rate of likes, views, favorites, etc. of a video just after its release is generally much higher compared to a month later. This variation in the growth of activity affects how frequently the pages corresponding to the videos are modified. Consequently, the rate of increase of invalid pages varies across different extents.

Another consideration involves supporting the functionality of expiring and deleting outdated data. For example, given that user preferences evolve over time, a social media platform can use time windows to keep track of users' recent browsing history, search actions, video preferences, etc. In such cases, data can be tagged with a time-to-live (TTL). This results in extents undergoing batch deletions when their storage duration ends. Without taking TTL into account, performing memory reclamation on data this is about to undergo batch deletions would result in inefficiency.

In view of the observations above, implementations of a workload-aware memory reclamation process for graph databases are provided. Memory reclamation can be performed on graph databases based on current update trends and various other data access characteristics that result in different fragmentation rates. Additionally or alternatively, TTL requirements can be used to inform the memory reclamation process. In some implementations, the workload-aware memory reclamation process is performed on a graph database based on Bw-trees. Workload-aware memory reclamation processes can be implemented in various ways. In some implementations, an in-memory structure is implemented to track TTL requirements and/or other various extent usage characteristics (e.g., data access characteristics that can affect fragmentation of memory storage). The tracking can be performed on a per-extent basis. Examples of extent usage characteristics include the latest update time in an extent, the total number of invalid page(s) or segment(s) of an extent, a rate at which pages become invalid in the extent, a TTL, etc. The tracked information can be used to determine a priority list of extents on which to perform memory reclamation.

Turning now to the Figures, implementations of a workload-aware memory reclamation process for graph databases are depicted and described in further detail. FIG. 1 shows a schematic view of an example computing system 100 for implementing a graph database 102 with workload-aware memory reclamation. The example computing system 100 includes processing circuitry 104 and memory 106 storing instructions that, during execution, cause the processing circuitry 104 to perform the processes described herein. The example computing system 100 can be implemented with various types of computing devices, including but not limited to personal computers, servers, and mobile devices. For example, the computing system 100 can include a plurality of computing devices, and processing circuitry 104 and memory 106 may each include multiple discrete components spread across multiple computing devices (e.g., processing circuitry 104 can include multiple processors within a single device or spread across multiple devices). The devices may be locally or remotely located. In some implementations, the computing system 100 is implemented as cloud storage servers. The example computing system 100 can also include non-depicted components for providing various functionalities, including components on individual computing devices.

The graph database 102 can be implemented in various ways. In some implementations, the graph database 102 is on a cache layer in memory, providing graph-native data management capabilities that relies on a persistent storage layer for persisting data. In the depicted example, the data of the graph database 102 is written to and persisted across a plurality of extents 108. As described above, the computing system 100 can be implemented as multiple devices. For example, the plurality of extents 108 can be located across multiple remote servers implementing a cloud storage solution. In the depicted example of FIG. 1, the graph database 102 uses a Bw-tree structure as a data storage engine. Other tree structures, such as $B^+$ trees, may also be implemented. Different implementations may have different advantages. With respect to Bw-trees, extents storing data of the Bw-tree database can be segregated into extents storing base page data and extents storing delta page data for more efficient memory reclamation. For example, in FIG. 1, the persistent storage extent layer 108 stores base page data 110 and delta page data 112 for the Bw-tree graph database 102. In some implementations, the base page data 110 and delta page data 112 are segregated across extents such that no extent stores both types of data. As delta pages generally have a shorter lifespan compared to base pages, memory reclamation on extent containing both types of data can be inefficient. In further implementations, the base page data 110 and delta page data 112 are each partitioned into uniformly-sized extents.

Over time, the Bw-tree graph database 102 performs query requests received from one or more clients. Certain requests can involve writing to the Bw-tree graph database 102. These changes are flushed to the storage layer containing the plurality of extents 108 to ensure data persistence. New data can be added, and old or moved data can be designated as invalid data. This creates "holes" in the memory storage of the extents 108, which can also be referred to as fragmentation. To address fragmentation, the invalid memory spaces can be reclaimed through a memory reclamation process, also referred to as a garbage collection process. As such, the computing system 100 further includes a memory reclamation module 114 for performing memory reclamation on the plurality of extents 108.

Figure 2:
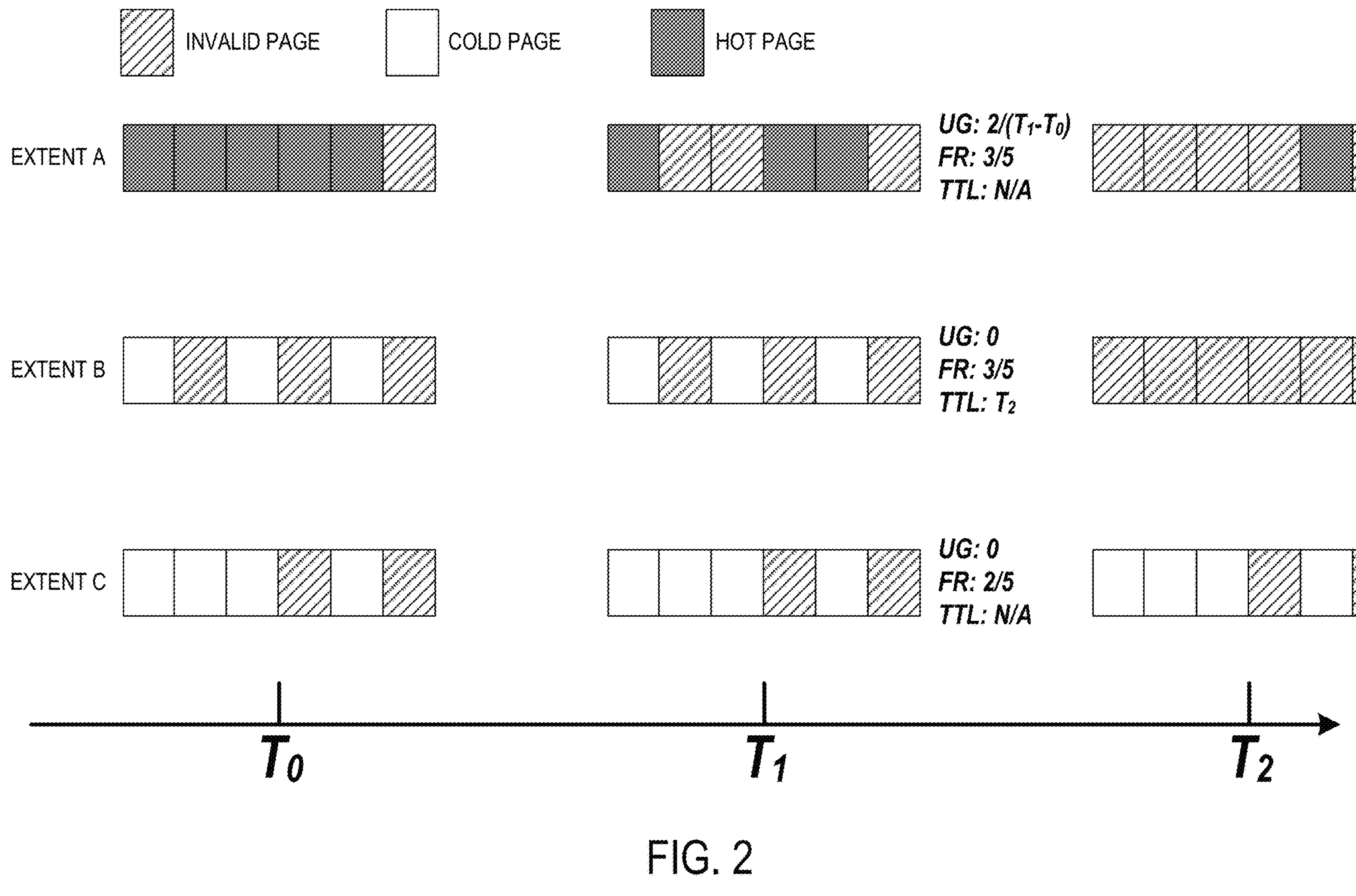
FIG. 2 shows a schematic view of three example extents having various extent usage characteristics.

Traditionally, the memory reclamation process includes selecting and reclaiming memory from the most fragmented extents. However, this introduces several inefficiencies. FIG. 2 illustrates these inefficiencies and depicts a schematic view of three example extents having various extent usage characteristics. FIG. 2 depicts and describes three types of extent usage characteristics: an update gradient, a fragmentation ratio, and a time-to-live indicator. An update gradient, a fragmentation ratio, and a time-to-live can be defined in various ways. In some implementations, the update gradient describes a rate of fragmentation, which can be defined as the change in the count of invalid pages in the extent divided by the unit of time that has passed. The fragmentation ratio can describe a current state of fragmentation and can be defined as the current number of invalid pages over the total number of pages in the extent. The time-to-live of a piece of data describes the amount of time a piece of data has before it expires and becomes invalid.

FIG. 2 illustrates how data becomes invalid over time in three distinct extents, assuming no space reclamation occurs. The three different extents are referred to as Extent A, Extent B, and Extent C, respectively. The extents are uniform in size and can each store six pages (for a Bw-tree) of uniform size. The number of pages is depicted for ease of illustration and discussion. In practice, an extent can be configured to hold many more pages. Furthermore, in some implementations, the extents are of different sizes.

Extent A contains "hot" pages that undergoes frequent updates. For example, Extent A can be storing data corresponding to a newly-released video on a social media platform. With frequent updates, the data within can become invalid more quickly. Updates can involve moving data from one location to another (e.g., when a page is split). Old data in old locations can be designated as invalid data. From time period $T_0$ to $T_1$, Extent A goes from having one invalid page to having three invalid pages. As such, Extent A's update gradient can be calculated as $(3-1)/(T_0-T_1)$, and its fragmentation ratio at $T_1$ is 3/5. In the depicted example, Extent A does not currently have data with a TTL.

Extent B has three pages of "cold" data that is valid and three pages of data that is invalid. The valid data has a TTL at $T_2$, meaning that all its data will have collectively expired at $T_2$. From $T_0$ to $T_1$, no update is performed on Extent B. As such, Extent B has an update gradient of zero and a fragmentation ratio of 3/5 (similar to Extent A).

Extent C starts with four pages of "cold" valid data and two pages of invalid data at $T_0$. From $T_0$ to $T_1$, no update is performed on Extent C. As such, Extent C has an update gradient of zero (similar to Extent C) and a fragmentation ratio of 2/5, which is the lowest of the three extents. Furthermore, the data stored in Extent C does not have a TTL.

Suppose a memory reclamation process is to be performed at $T_1$, and the algorithm needs to select an extent from which to first reclaim memory. Traditional reclamation strategies would select either Extent A or B, as they have the highest fragmentation rate (3/5). However, such strategies do not consider the issues of TTL and "hot" data being frequently updated. If Extent A is chosen at $T_1$, three pages will have to be moved. However, two of those three pages will become invalid at $T_2$, resulting in a waste of two-thirds of the written I/O. Similarly, when Extent B reaches the $T_2$ point, all its data will have collectively expired. As such, if Extent B is chosen at $T_1$, its three valid pages will be inefficiently moved to a new extent. All of the written I/O would be wasted. Instead of selecting Extent A or Extent B, the most efficient use of writes would be to select Extent C for memory reclamation, even though Extent C has the lowest ratio of fragmentation.

Referring back to FIG. 1, the memory reclamation module 114 can be configured to perform workload-aware space reclamation on a list of extents that have been sorted for reclamation priority. The list of extents can be sorted in various ways. In some implementations, the list of extents is sorted based on the extent usage characteristics of the extents (as discussed in FIG. 2). In the depicted example, the extents 108 store extent usage characteristics data 116. Such data can be formatted in various ways. The extent usage characteristics data 116 can include one or more of any type of data access characteristic that affects fragmentation. For example, the extent usage characteristics data 116 can include an update gradient, a fragmentation ratio, and a TTL (if any) for each of the plurality of extents 108, which can be recorded separately. The TTL data can include information describing an extent's TTL for each of the plurality of extents 108. An extent's TTL can be defined in various ways. In some implementations, the timestamp of the most recently updated piece of data in an extent is assigned as the timestamp for the entire extent. Generally, the data timestamps within each extent tend to be quite similar for many applications. In scenarios where data expiration is relevant, an extent's TTL can be readily determined by adding the expiration period (retrieved from upper-layer applications) to its timestamp.

The memory reclamation module 114 can utilize the extent usage characteristics data 116 to generate and/or sort a list of extents into an order of reclamation priority to provide a more I/O efficient memory reclamation process compared to traditional methods. In some implementations, the memory reclamation module 114 algorithmically selects extents with cold data and a low update gradient. Among these extents, the extent with the highest fragmentation ratio for reclamation can be selected. In situations where data expiration is involved (TTL), those extents can be bypassed and allowed to expire naturally. For example, the memory reclamation module 114 can exclude extents with a TTL below a predetermined threshold. In some implementations, the extent(s) primarily storing delta page data 112 is prioritized for reclamation when the update gradients, fragmentation rates, and TTLs of multiple extents are the same. This example algorithmic approach effectively reduces the write amplification rate in the storage system compared to traditional techniques. Other algorithms can also be used. In some implementations, a formulaic combination of update gradients and fragmentation ratios, appropriately weighted, is used to determine the order of priority. For example, an extent with a slightly higher update gradient can be selected if its fragmentation ratio is relatively high. In another example, an extent filled with invalid data can be selected despite having a high update gradient.

Figure 3:
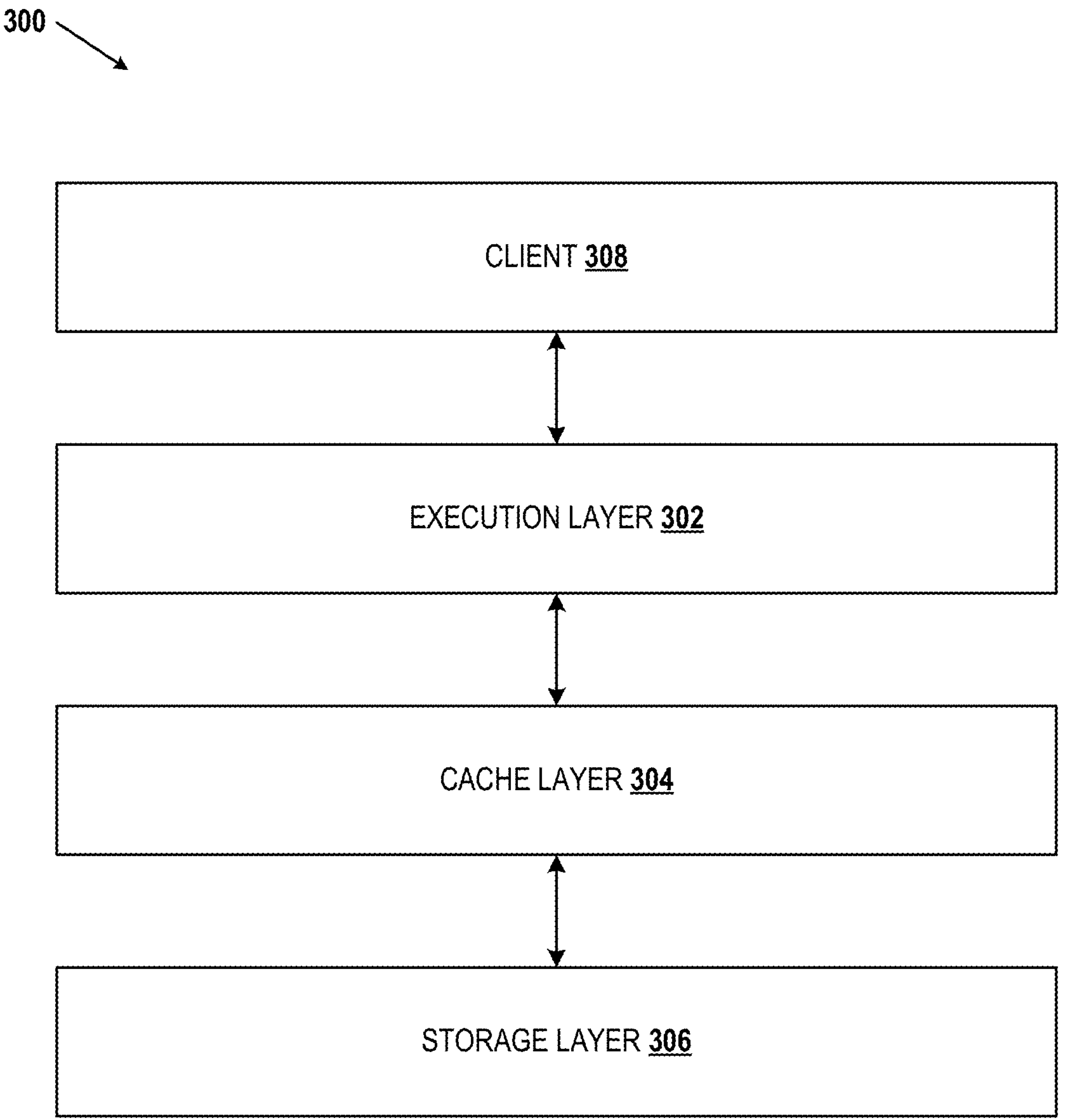
FIG. 3 shows an example architecture for implementing a graph database with workload-aware memory reclamation, which can be implemented using the example computing system of FIG. 1.

FIG. 3 shows an example architecture 300 for implementing a graph database with workload-aware memory reclamation. The example architecture 300 includes three layers 302-306 implementing the tree graph database that can be accessed/queried by one or more clients 308. The first of the three layers includes an execution layer 302 responsible for converting query language into specific execution plans, which can include handling computation-intensive operations (e.g., sorting, aggregation). The second layer is a cache layer 304 in memory that provides graph-native data management utilizing a tree graph index. The cache layer 304 implements an application interface that provides access to a graph database, such as the graph database 102 of FIG. 1. Furthermore, the cache layer 304 can include a memory reclamation component capable of performing workload-aware memory reclamation for more efficient space management. The third layer is a storage layer 306 responsible for persisting data generated by the cache layer 304. The storage layer 306 can be implemented in various ways. In some implementations, the storage layer includes an append-only cloud storage.

Figure 4:
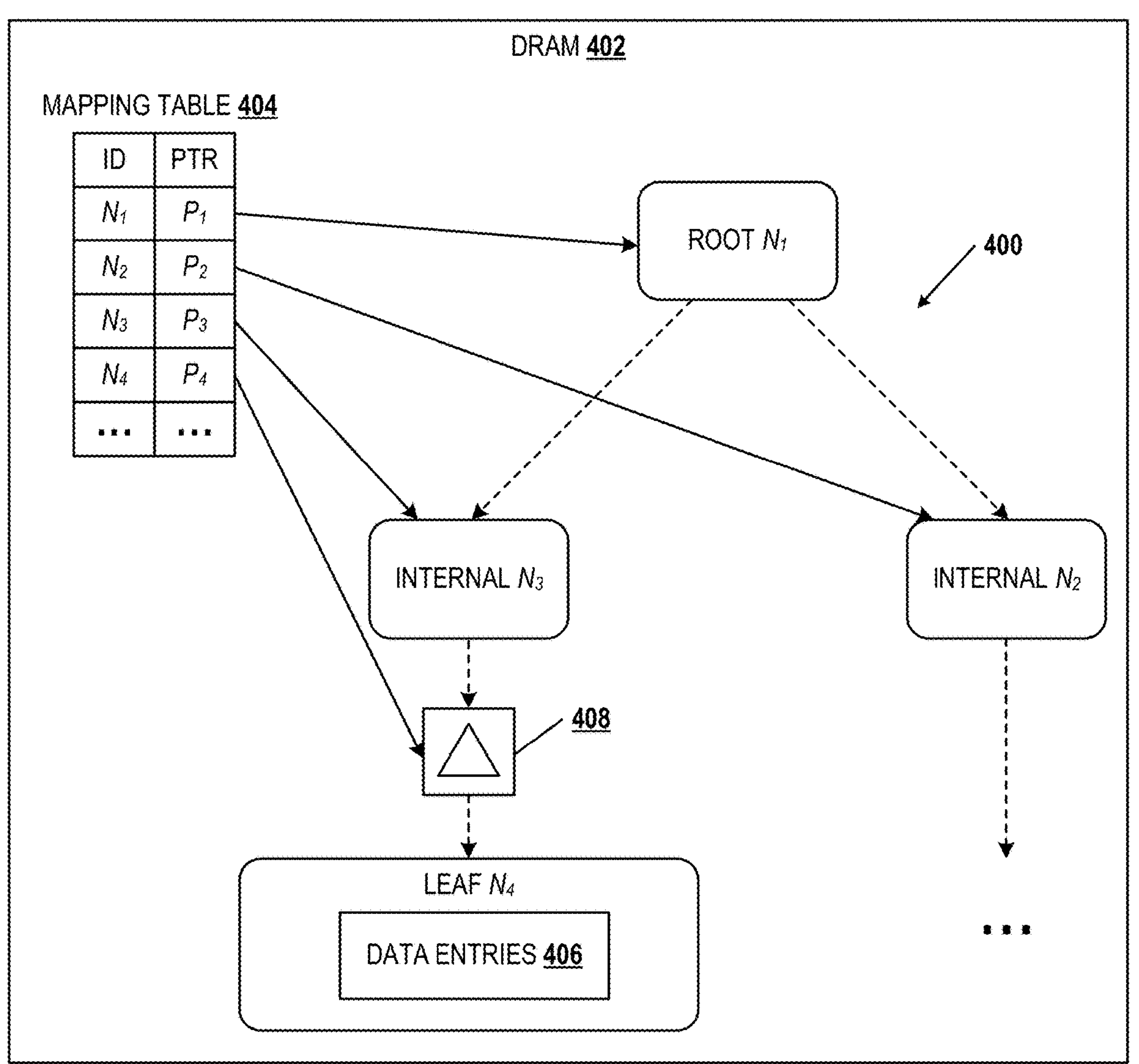
FIG. 4 shows a schematic view of an example Bw-tree graph database, which can be implemented using the example computing system of FIG. 1.

FIG. 4 shows a schematic view of an example Bw-tree graph database 400. In the depicted example, the Bw-tree graph database 400 is implemented in DRAM 402, providing graph-native data management. Data persistence can be performed on a storage layer such as, for example, a cloud storage solution. The Bw-tree graph database 400 is organized using a mapping table 404 that describes the locations of the nodes (pages) of the Bw-tree. The mapping table 404 includes an identifier column that lists identifiers of the nodes and a corresponding pointer column that lists respective pointers to the locations of the nodes. The example Bw-tree database 400 includes at least a root node $N_1$, internal nodes $N_2$ and $N_3$, and a leaf node $N_4$. In some implementations, data entries 406 are stored at the leaf node $N_4$. In other implementations, each of the leaf nodes of the Bw-tree includes a pointer to a respective data block that stores data entries.

One distinct feature of Bw-trees is the update process. Updates to the Bw-tree graph database involve prepending one or more delta pages to a base page that is to be updated.

A delta page describes the changes to be made to the base page to enact the requested updates. The prepended delta page points to the base page, and pointers to the base page are redirected to the delta page. Redirecting pointers can be performed via an atomic operation to ensure system integrity. After several updates, a chain of delta pages can form. As the chain grows, search performance can suffer. To address this, page consolidation can be performed periodically to create a new base page with the prepended delta page updates applied. In the depicted example, a delta page 408 is prepended to the leaf node $N_4$. Accordingly, internal node $N_3$ and pointer $P_4$ listed on the mapping table 404 point to the delta page 408, and the delta page 408 points to the leaf node $N_4$.

The data entries 406 can be in any kind of format. In some implementations, each data entry 406 includes a key-value pair. Using the social media platform example described above, each data entry 406 can include information describing a like-action performed by a user on a media content. In some implementations, the Bw-tree graph database 400 stores edge information of a graph where nodes represent users and media content and where an edge between two nodes represents a user (first node) performing a like-action on a media content (second node). In this scenario, whenever a user performs a like-action on a media content, an edge is established between the node representing the user and the node representing the media content. This edge, which describes the source and destination nodes, can be stored in the Bw-tree graph database 400 as the key of a data entry to represent a user performing a like-action on a media content. Edge features (e.g., the time when the like-action was performed) can be stored as a value associated with the key. Additionally or alternatively, the Bw-tree graph database 400 can store information describing relationships between users (e.g., subscriber, follower, etc.). For example, rather than storing an edge between a user node and a media content node, the Bw-tree graph database 400 can store information relating to an edge between users. Directed edges can be used to identify the follower/followee relationship. In some implementations, this relationship is defined by how the information is stored (e.g., first node indicates the follower).

FIG. 5 shows a process flow diagram of an example method 500 for performing workload-aware memory reclamation. The method 500 includes, at step 502, tracking extent usage characteristics for each of a plurality of extents storing data for a graph database. Various types of graph databases can be utilized. In some implementations, the graph database comprises a Bw-tree graph database. An extent is a physical unit of memory storage. Storing data for a graph database in the plurality of extents can be implemented in various ways. In some implementations, each of the extents stores a plurality of pages that describes a Bw-tree graph.

Various types of extent usage characteristics can be tracked. Generally, any type of data access characteristic affecting the fragmentation of an extent can be tracked. In some implementations, the extent usage characteristics comprise one or more of an update gradient, a fragmentation ratio, or time-to-live information. An update gradient, a fragmentation ratio, and a TTL can be defined in various ways. In some implementations, the update gradient describes a rate of fragmentation, which can be defined as the change in the count of invalid pages in the extent divided by the unit of time that has passed. The fragmentation ratio can describe a current state of fragmentation and can be defined as the current number of invalid pages over the total number of pages in the extent. TTL can describe the amount of time a piece of data has before it expires and becomes invalid.

The TTL information can describe the TTL of data within an extent in various ways. A given extent can store data from multiple pages in a Bw-tree graph database. Different pages may have different TTL and/or may be updated at different times. In some implementations, the tracked TTL information is based on a TTL of a most recently updated piece of data in the respective extent. For example, the data timestamps within each extent generally tend to be similar. As such, the tracked TTL information can be a timestamp of the most recently updated piece of data in the extent. The TTL of the extent can be determined by adding the expiration period to the timestamp.

The method 500 includes, at step 504, performing memory reclamation to reclaim storage areas corresponding to invalid data. Memory reclamation can be performed in various ways. Substeps 504A and 504B describe one such example.

At substep 504A, the process of performing memory reclamation can include generating a list of extents to be reclaimed based on the tracked extent usage characteristics. The list of extents can be generated in various ways. The list of extents to be reclaimed can be generated based on a formulaic combination of the update gradients and the fragmentation ratios of the plurality of extents. Any formula with different combinations and weights can be utilized. Additionally or alternatively, the list of extents excludes extents containing a TTL below a predetermined threshold.

In some implementations, generating the list of extents includes first generating an initial list of extents. The initial list can be generated in various ways. In some implementations, the initial list includes a subset of the plurality of extents that contains a smallest update gradient. Other criteria may be used. For example, the initial list can be a predetermined number of the plurality of extents having the smallest update gradient. Generating the list of extents can further include sorting the initial list of extents in an order of reclamation priority based on the tracked extent usage characteristics. The order of reclamation priority can be determined in various ways. In some implementations, the order or reclamation priority is based on the fragmentation ratios of the extents in the list.

At substep 504B, the process of performing memory reclamation can include reclaiming memory space on the plurality of extents in order based on the list. The process can continue to cyclically retrieve lists of extents to reclaim memory. For example, the process can process lists of extents in batches based on the update gradient, wherein the current batch being processed is a batch with the current smallest update gradient.

Memory reclamation can be performed on various types of graph databases. On Bw-tree graph databases where data is partitioned into extents, information regarding fragmentation tendencies can be tracked on a per-extent basis. The tracked information can be used to advantageously rank the extents to determine which extent contains data that is more likely to be updated, thus likely generating invalid data segments. Extents with data that is more likely to be updated are of lower priority since they are likely to be more fragmented in the near future (compared to a relatively stable extent containing data that has not been updated recently). The memory reclamation process can then be performed based on the ranked list.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
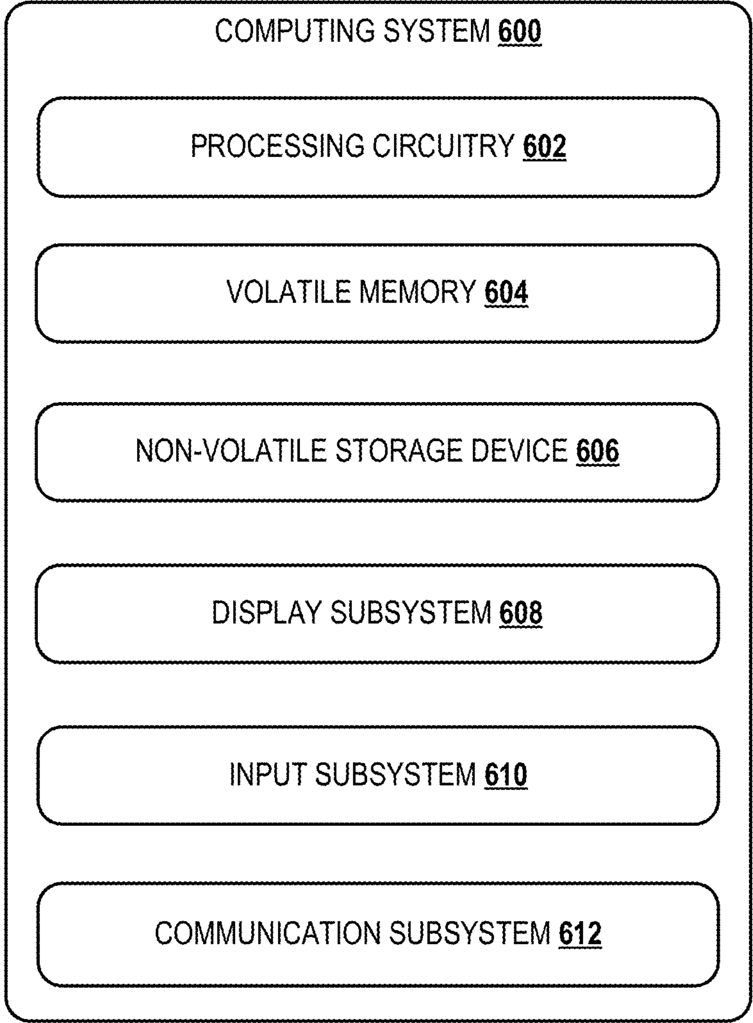
FIG. 6 shows a schematic view of an example computing system that can enact one or more of the methods and processes described herein.

FIG. 6 schematically shows a non-limiting embodiment of a computing system 600 that can enact one or more of the methods and processes described above. Computing system 600 is shown in simplified form. Computing system 600 may embody the computing system 100 described above and illustrated in FIG. 1. Components of computing system 600 may be included in one or more personal computers, server computers, tablet computers, home-entertainment computers, network computing devices, video game devices, mobile computing devices, mobile communication devices (e.g., smart phone), and/or other computing devices.

Computing system 600 includes processing circuitry 602, volatile memory 604, and a non-volatile storage device 606. Computing system 600 may optionally include a display subsystem 608, input subsystem 610, communication subsystem 612, and/or other components not shown in FIG. 6.

Processing circuitry 602 includes a logic processor that can be implemented with one or more physical devices configured to execute instructions. For example, the processing circuitry 602 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processing circuitry 602 may include one or more physical processors configured to execute software instructions. Additionally or alternatively, the processing circuitry 602 may include one or more hardware logic circuits or firmware devices configured to execute hardware-implemented logic or firmware instructions. Processors of the processing circuitry 602 may be single-core or multi-core, and the instructions executed thereon may be configured for sequential, parallel, and/or distributed processing. Individual components of the processing circuitry 602 optionally may be distributed among two or more separate devices, which may be remotely located and/or configured for coordinated processing. Aspects of the processing circuitry 602 may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the processing circuitry 602 to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by processing circuitry 602 to temporarily store information during processing of software instructions. It will be appreciated that volatile memory 604 typically does not continue to store instructions when power is cut to the volatile memory 604.

Aspects of processing circuitry 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via processing circuitry 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with processing circuitry 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, camera, or microphone.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 600 to send and/or receive messages to and/or from other devices via a network such as the Internet.

The following paragraphs provide additional description of the subject matter of the present disclosure. One example provides a computing system for performing workload-aware space reclamation, the computing system comprising: processing circuitry and memory storing instructions that, during execution, causes the processing circuitry to: track extent usage characteristics for each of a plurality of extents storing data for a graph database; and perform memory reclamation to reclaim storage areas corresponding to invalid data, wherein performing the memory reclamation comprises: generating a list of extents to be reclaimed based on the tracked extent usage characteristics; and reclaiming memory space on the plurality of extents in order based on the list of extents. In this example, additionally or alternatively, generating the list of extents comprises: generating an initial list of extents; and sorting the initial list in an order of reclamation priority based on the tracked extent usage characteristics. In this example, additionally or alternatively, the tracked extent usage characteristics comprise an update gradient describing a rate of fragmentation; and the initial list of extents is generated by selecting a subset of the plurality of extents that contains a smallest update gradient. In this example, additionally or alternatively, the tracked extent usage characteristics further comprise a fragmentation ratio describing a current state of fragmentation; and the order of reclamation priority is based on the fragmentation ratios of the extents in the initial list of extents. In this example, additionally or alternatively, the tracked extent usage characteristics comprise: an update gradient describing a rate of fragmentation; and a fragmentation ratio describing a current state of fragmentation, wherein the list of extents to be reclaimed is generated further based on a ranking of a formulaic combination of the update gradients and the fragmentation ratios of the plurality of extents. In this example, additionally or alternatively, the tracked extent usage characteristics comprise time-to-live information for each of the plurality of extents, wherein the list of extents excludes extents containing time-to-live information below a predetermined threshold. In this example, additionally or alternatively, the time-to-live information for a given extent is based on a time-to-live of a most recently updated piece of data in the given extent. In this example, additionally or alternatively, the graph database comprises a Bw-tree graph database. In this example, additionally or alternatively, the plurality of extents comprises a first subset of extents storing base page data and a second subset of extents storing delta page data. In this example, additionally or alternatively, the Bw-tree graph database is implemented on a social media platform.

Another example provides a method for performing workload-aware space reclamation, the method comprising: tracking extent usage characteristics for each of a plurality of extents storing data for a graph database; and performing memory reclamation to reclaim storage areas corresponding to invalid data, wherein performing the memory reclamation comprises: generating a list of extents to be reclaimed based on the tracked extent usage characteristics; and reclaiming memory space on the plurality of extents in order based on the list of extents. In this example, additionally or alternatively, generating the list of extents comprises: generating an initial list of extents; and sorting the initial list in an order of reclamation priority based on the tracked extent usage characteristics. In this example, additionally or alternatively, the tracked extent usage characteristics comprise an update gradient describing a rate of fragmentation; and the initial list of extents is generated by selecting a subset of the plurality of extents that contains a smallest update gradient. In this example, additionally or alternatively, the tracked extent usage characteristics further comprise a fragmentation ratio describing a current state of fragmentation; and the order of reclamation priority is based on the fragmentation ratios of the extents in the initial list of extents. In this example, additionally or alternatively, the tracked extent usage characteristics comprise: an update gradient describing a rate of fragmentation; and a fragmentation ratio describing a current state of fragmentation, wherein the list of extents to be reclaimed is generated further based on a formulaic combination of the update gradients and the fragmentation ratios of the plurality of extents. In this example, additionally or alternatively, the tracked extent usage characteristics comprise time-to-live information for each of the plurality of extents, wherein the list of extents excludes extents containing time-to-live information below a predetermined threshold. In this example, additionally or alternatively, the time-to-live information for a given extent is based on a time-to-live of a most recently updated piece of data in the given extent. In this example, additionally or alternatively, the graph database comprises a Bw-tree graph database. In this example, additionally or alternatively, the plurality of extents comprises a first subset of extents storing base page data and a second subset of extents storing delta page data.

Another example provides a method for performing workload-aware space reclamation, the method comprising: storing a Bw-tree graph database, wherein the Bw-tree graph database comprises base page data stored in a first plurality of extents; performing update queries on the Bw-tree graph database, wherein performing the update queries creates delta page data stored in a second plurality of extents different from the first plurality of extents; tracking extent usage characteristics for each of the extents of the first and second pluralities of extents, wherein the extent usage characteristics comprise at least an update gradient and a fragmentation ratio; consolidating delta changes from the update queries, wherein consolidating the delta changes generates invalid data in the first and second pluralities of extents; and performing memory reclamation to reclaim storage areas corresponding to the invalid data, wherein performing the memory reclamation comprises: selecting an extent from the first and second pluralities of extents based on the tracked extent usage characteristics; and reclaiming memory space corresponding to the invalid data of the selected extent.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for performing workload-aware space reclamation, the computing system comprising:

processing circuitry and memory storing instructions that, during execution, causes the processing circuitry to:

track extent usage characteristics for each of a plurality of extents storing data for a graph database; and perform memory reclamation to reclaim storage areas corresponding to invalid data, wherein performing the memory reclamation comprises:

generating a list of extents to be reclaimed based on the tracked extent usage characteristics, wherein the tracked extent usage characteristics comprise:

a fragmentation ratio describing a current state of fragmentation; and an update gradient describing a rate of fragmentation, wherein the list of extents to be reclaimed is generated further based on a ranking of a formulaic combination of the update gradients and the fragmentation ratios of the plurality of extents; and reclaiming memory space on the plurality of extents in order based on the list of extents.

2. The computing system of claim 1, wherein generating the list of extents comprises:

generating an initial list of extents; and sorting the initial list in an order of reclamation priority based on the tracked extent usage characteristics.

3. The computing system of claim 1, wherein:

the tracked extent usage characteristics comprise time-to-live information for each of the plurality of extents, wherein the list of extents excludes extents containing time-to-live information below a predetermined threshold.

4. The computing system of claim 3, wherein the time-to-live information for a given extent is based on a time-to-live of a most recently updated piece of data in the given extent.

5. The computing system of claim 1, wherein the graph database comprises a Bw-tree graph database.

6. The computing system of claim 5, wherein the plurality of extents comprises a first subset of extents storing base page data and a second subset of extents storing delta page data.

7. The computing system of claim 5, wherein the Bw-tree graph database is implemented on a social media platform.

8. A method for performing workload-aware space reclamation, the method comprising:

tracking extent usage characteristics for each of a plurality of extents storing data for a graph database; and performing memory reclamation to reclaim storage areas corresponding to invalid data, wherein performing the memory reclamation comprises:

generating a list of extents to be reclaimed based on the tracked extent usage characteristics, wherein the tracked extent usage characteristics comprise:

a fragmentation ratio describing a current state of fragmentation; and an update gradient describing a rate of fragmentation, wherein the list of extents to be reclaimed is generated further based on a ranking of a formulaic combination of the update gradients and the fragmentation ratios of the plurality of extents; and reclaiming memory space on the plurality of extents in order based on the list of extents.

9. The method of claim 8, wherein generating the list of extents comprises:

generating an initial list of extents; and sorting the initial list in an order of reclamation priority based on the tracked extent usage characteristics.

10. The method of claim 8, wherein:

the tracked extent usage characteristics comprise time-to-live information for each of the plurality of extents, wherein the list of extents excludes extents containing time-to-live information below a predetermined threshold.

11. The method of claim 10, wherein the time-to-live information for a given extent is based on a time-to-live of a most recently updated piece of data in the given extent.

12. The method of claim 8, wherein the graph database comprises a Bw-tree graph database.

13. The method of claim 12, wherein the plurality of extents comprises a first subset of extents storing base page data and a second subset of extents storing delta page data.

14. A method for performing workload-aware space reclamation, the method comprising:

storing a Bw-tree graph database, wherein the Bw-tree graph database comprises base page data stored in a first plurality of extents;

performing update queries on the Bw-tree graph database, wherein performing the update queries creates delta page data stored in a second plurality of extents different from the first plurality of extents;

tracking extent usage characteristics for each of the extents of the first and second pluralities of extents, wherein the extent usage characteristics comprise at least an update gradient and a fragmentation ratio;

consolidating delta changes from the update queries, wherein consolidating the delta changes generates invalid data in the first and second pluralities of extents; and performing memory reclamation to reclaim storage areas corresponding to the invalid data, wherein performing the memory reclamation comprises:

selecting an extent from the first and second pluralities of extents based on the tracked extent usage characteristics, wherein the extent is selected based on a ranking of a formulaic combination of the update gradients and the fragmentation ratios of the first and second pluralities of extents; and reclaiming memory space corresponding to the invalid data of the selected extent.

* * * * *